United States Patent
Amulu et al.

(10) Patent No.: US 9,519,701 B2
(45) Date of Patent: Dec. 13, 2016

(54) GENERATING INFORMATION MODELS IN AN IN-MEMORY DATABASE SYSTEM

(71) Applicants: James Michael Amulu, Bangalore (IN); Sudarsan Gokhale Raghunath, Bangalore (IN)

(72) Inventors: James Michael Amulu, Bangalore (IN); Sudarsan Gokhale Raghunath, Bangalore (IN)

(73) Assignee: SAP SE, Walldorf (DE)

( * ) Notice: Subject to any disclaimer, the term of this patent is extended or adjusted under 35 U.S.C. 154(b) by 503 days.

(21) Appl. No.: 13/673,012

(22) Filed: Dec. 26, 2012

(65) Prior Publication Data

US 2014/0181154 A1    Jun. 26, 2014

(51) Int. Cl.
*G06F 17/30* (2006.01)

(52) U.S. Cl.
CPC .............................. *G06F 17/30587* (2013.01)

(58) Field of Classification Search
CPC ............ G06F 17/30592; G06F 17/3089; G06F 17/30587
See application file for complete search history.

(56) References Cited

U.S. PATENT DOCUMENTS

| | | | | |
|---|---|---|---|---|
| 5,019,961 | A * | 5/1991 | Addesso | G06F 17/5022 700/87 |
| 5,974,253 | A * | 10/1999 | Nahaboo et al. | 717/105 |
| 2002/0169658 | A1* | 11/2002 | Adler | G06Q 10/06 705/7.28 |
| 2004/0001050 | A1 | 1/2004 | Fievre | |
| 2004/0027388 | A1* | 2/2004 | Berg | G06Q 10/063 715/781 |
| 2005/0289094 | A1 | 12/2005 | Plate | |
| 2006/0116976 | A1* | 6/2006 | Legault | G06F 17/30592 |
| 2008/0312979 | A1* | 12/2008 | Lee et al. | 705/7 |
| 2009/0300061 | A1* | 12/2009 | Murthy et al. | 707/103 R |
| 2010/0161524 | A1* | 6/2010 | Amid | G06N 5/022 706/12 |
| 2011/0208788 | A1* | 8/2011 | Heller et al. | 707/810 |
| 2012/0005190 | A1* | 1/2012 | Faerber et al. | 707/718 |
| 2013/0111506 | A1* | 5/2013 | Guddanti et al. | 719/328 |
| 2013/0339379 | A1* | 12/2013 | Ferrari et al. | 707/766 |

* cited by examiner

Primary Examiner — Tarek Chbouki

(57) ABSTRACT

Various embodiments of systems and methods for generating information models in an in-memory database system by importing data foundation from existing Semantic layer files are described herein. The method includes specifying a type of information view to be generated to model content data. Further the method includes invoking the content data from existing semantic layer files using an import option of a content data editor interface. Subsequent to selecting one or more semantic layer files, automatically extracting table objects corresponding to the selected semantic layer files along with data foundation objects from a file source.

19 Claims, 9 Drawing Sheets

GENERATING INFORMATION MODELS IN AN IN-MEMORY DATABASE SYSTEM

FIELD

The field relates generally to generating information views to model business data. More specifically, the field relates to generating information models in an in-memory database system by importing data foundation from existing semantic layer files.

BACKGROUND

Recent developments in in-memory technology have implemented in-memory databases in analytic data processing systems in place of the traditional database management systems (DBMS). An example of an in-memory data processing system is the In-memory Appliance (HANA™) from SAP AG. An in-memory data processing system may perform both transactional and analytic data processing due to the speed available from storing the data in main memory (as opposed to the disk storage of non-in-memory database systems).

In-memory data processing systems enable organizations to analyze their business operations using huge volumes of detailed information while the business is running. In-memory computing technology allows the processing of massive quantities of data in main memory to provide immediate results from analysis and transaction. The data to be processed is ideally real-time data (that is, data that is available for processing or analysis immediately after it is created). This enables organizations to instantly explore and analyze all of its transactional and analytical data in real time.

In-memory data processing systems may consist of several parts including an in-memory database (e.g., SAP HANA database) and database administration and development tool (e.g., SAP HANA studio). In-memory databases may have column and row store capabilities which allows high-performance processing and analysis of data already on the database and therefore prevents the necessity to transfer data from the database to on application server. Further, the in-memory database allows for modeling data as tables and views. Tables are tabular data structures, each row identifying a particular entity, and each column having a unique name. Views are combinations and selections of data from tables modeled to serve a particular purpose.

The database administration and development tool, also referred to as database modeler is a graphical data modeling tool which allows you to design analytical models and analytical privileges that govern the access to those models. The information model designing process in the database modeler involves building data foundation for creating information models. The data foundation is a schema that defines the relevant tables and relationships from one or more relational databases.

On the other hand, semantic based information design tools (e.g., SAP Business Objects information Design Tool) involve a data abstraction layer called a semantic layer which is a collection of classes and objects (data foundation). Semantic layer based data foundation consists of subject area specific data foundation objects that are large with tables, relationships and cardinality. However, current users of semantic based information design tools who want to adopt in-memory computing technology, have to manually re-create the entire data foundation of tables and relationships by understanding the existing semantic layer data foundation.

SUMMARY

Various embodiments of systems and methods for generating information models in an in-memory database system by importing data foundation from existing semantic layer files are described herein. In an embodiment, the method includes defining a space in a repository of the system to store the generated information models. The defined space is created as a node also referred to as a package on the modeler view of the database modeler main window. In an aspect, a type of information view to be generated to model content data is specified by navigating a context menu of the defined package. In another aspect, the content data that is to be modeled according to the selected type of information view is invoked using an import option in a content data editor interface. Selecting the import option, launches a file explorer to invoke semantic layer files stored in a file source. In yet another aspect, selecting one or more of the invoked semantic layer files, automatically extracts table objects corresponding to the selected semantic layer files which are then populated on a modeler canvas of the modeler main window. Further, the relationships and connections between the extracted table columns are automatically identified from the file source and populated into the content data editor. Also, the cardinality between the table columns are automatically read from the file source and populated into the content data editor. In yet another aspect, the selected view is activated from the context menu of the defined package.

A computer system may operate to implement the method described above. The computer system may store, execute or be otherwise controlled by one or more computer programs that control the computer system to implement the method described above.

A non-transitory computer readable medium may store instructions to control a computer system to perform the method described above. The instructions may include an in-memory database component, a processing component, and an output component.

The following detailed description and accompanying drawings provide a better understanding of the nature and advantages of the present disclosure.

BRIEF DESCRIPTION OF THE DRAWINGS

The claims set forth the embodiments with particularity. The embodiments are illustrated by way of example and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Figure 1:
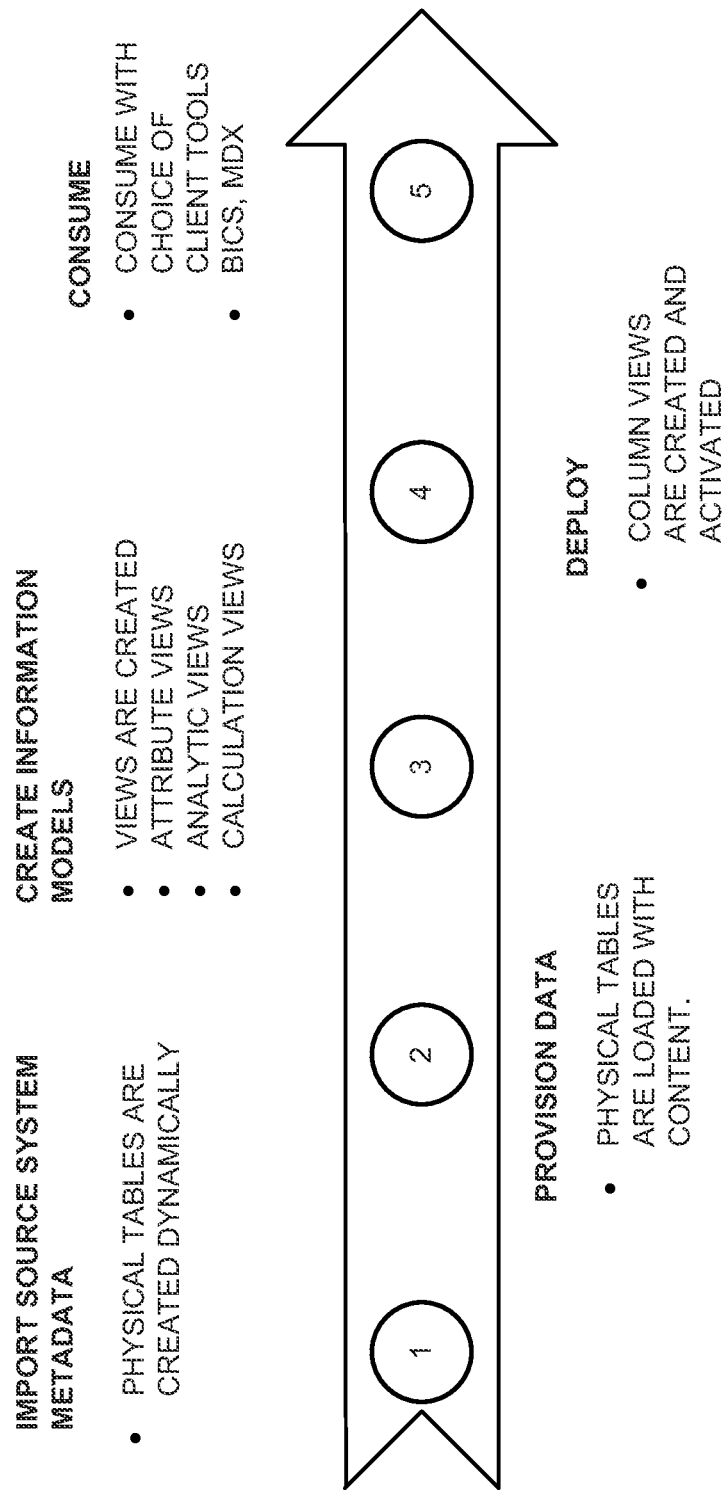
FIG. 1 is a block diagram representing a modeling process flow of an in-memory database system, according to one embodiment.

Embodiments of techniques for generating information models in an in-memory database system by importing data foundation from existing semantic layer files are described herein. In the following description, numerous specific details are set forth to provide a thorough understanding of embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one embodiment of the one or more embodiments. Thus, the appearances of these phrases in various places throughout this specification are not necessarily all referring to the same embodiment. Furthermore, the particular features, structures, or characteristics may be combined in any suitable manner in one or more embodiments.

An in-memory database is a relational database whose tables can be stored in memory. This particular storage method is completely transparent for the designer who will see the usual logical representation of tables as rows and columns of data. As a normal relational database, the in-memory database has the concepts of tables, joins, keys and SQL views. The in-memory database can be accessed via ODBC and JDBC drivers and its tables can be defined and queried with SQL language.

Some of the components and administration tools of in-memory data processing system include an In-Memory Computing Engine (IMCE) Server and a suite of tools for modeling which includes an information modeler. The database administration and development tool is an eclipse-based interface that provides in-memory computing engine administrators with easy-to-use, data management tools and business centric data modeling tools (information modeler). The information modeler allows technical users to create new or modify existing models of data. Tables are managed by the database administration and development tool to build business or calculation models on the tables. For example, SAP's HANA Studio is a tool for developers who wish to create data models and stored procedures, or manipulate tables and issue queries interactively. These models are called "Information models" and they are also interchangeably referred to as "Information views," "column views," "in-memory database views," "in-memory database models," or "in-memory database cubes." These models can provide a dimensional representation of the data and, in some circumstances, can be compared to OLAP cubes.

Information views are created to model various slices of data stored in an in-memory database. Information views used various combinations of content data (that is, non-metadata) to model a business use case. Content data can be classified as Attributes and Measures. An Attribute represents descriptive data such as customer ID, city, country, and the like. Attributes are individual non-measurable analytical elements. Whereas a Measure represents the quantifiable data such as revenue, quantity sold, counters, and the like. Measures are simple measurable analytical elements. Measures are derived from analytic and calculation views. Information views are often used for analytical use cases such as operational data mart scenarios or multidimensional reporting on revenue, profitability, etc. There are at least three types of information views namely Attribute view, Analytic view, and Calculation view. All three types of information views are non-materialized views.

Attribute view—An attribute view is used to model an entity based on the relationships between attribute data contained in multiple source tables. Attribute view describes the dimensions of a data model and can be hierarchical (e.g. the "Customer" dimension, the "Geography" dimension; dimensions might have zero to many associated hierarchies). For example, customer ID is the attribute data that describes measures (that is, who purchased a product). However, customer ID has mach more depth to it when joined with other attribute data that further describes the customer (customer address, customer relationship, customer status, customer hierarchy, and so on). An attribute view can be created to locate the attribute data and to define the relationships between the various tables to model how customer attribute data, for example, will be used to address business needs. Attribute views can later be joined to tables that contain measures within the definition of an analytic view or calculation view to create virtual star schema on the in-memory database data.

Analytic view—An Analytic view is used to model data that includes measures. An Analytic view describes the facts related to some dimensions. Those facts come from a single fact table (e.g. the "Actual" revenue and cost). For example, an operational data mart representing sales order history would include measures for quantity, price, and the like. The data foundation of an analytic view can contain multiple tables. However, measures that are selected for inclusion in an analytic view must originate from one of these tables. Analytic views can be simply a combination of tables that contain both attribute data and measure data.

Calculation view—A calculation view is used to define more advanced slices on the data in in-memory database. Calculation view renders complex models that can combine multiple analytic views (i.e., to create a multi-fact cube) or that can be defined programmatically using the SQL script language. Calculation views are typically used when the business use case requires advanced logic that is not covered in the previous types of information views. For example, calculation views can have layers of calculation logic, can include measures sourced from multiple source tables, can include advanced SQL logic and so on. The data foundation of the calculation view can include any combination of tables, column views, attribute views, and analytic views.

Typically, the various information views are modeled in the information modeler tool following the steps as shown with reference to FIG. 1. As shown in FIG. 1, the steps of the modeling process include 1) importing the table definitions i.e., source system metadata into the modeler perspective; 2) after the table definitions are imported, the physical tables are loaded with content data; 3) further, information models are created based on the content data in the tables; 4) the created views are deployed by creating and activating the information views and 5) the created information views are consumed using client tools such as SAP's Business Intelligence Consumer Services (BICS) and Multi-Dimensional eXpressions (MDX).

In more detail, the prerequisites for performing the modeling process include installing the information modeler tool on a workstation (computer), obtaining user credentials, and obtaining access to the in-memory appliance running on a host named e.g., "tool.mynetwork.com" from the workstation via TCP/IP. Once the prerequisites are fulfilled, the mode of operation, known as perspective is selected from the upper right corner of the modeler window, which is the graphical user interface of the information modeler tool. The two main perspectives offered by information modeler tool are Information Modeler Perspective and the Administration Console Perspective.

As an initial step, the perspective is switched to Information Modeler perspective. The Information Modeler perspective offers features to create and edit data models and stored procedures that can be used by analytics application such as Business Objects Explorer analytics application and certified products which support MDX, SQL or BICS. The artifacts created by the Modeler are stored directly in the in-memory database tables as XML documents ("design-time objects"). Once in the modeler perspective, a system node is added wherein to create content objects for analytical purposes according to the following procedure:

1. From the desktop, choose Start>Modeler tool.
2. Choose Window>Open Perspective>Other.
3. Choose Modeler perspective.
4. Choose OK.
5. Navigate to the Navigator pane.
6. From the context menu, choose Add System.
7. Enter the host name, instance number, and a description for the system you want to add.
8. Choose Next.
9. Select the required options.
10. Choose Finish.

Figure 2:
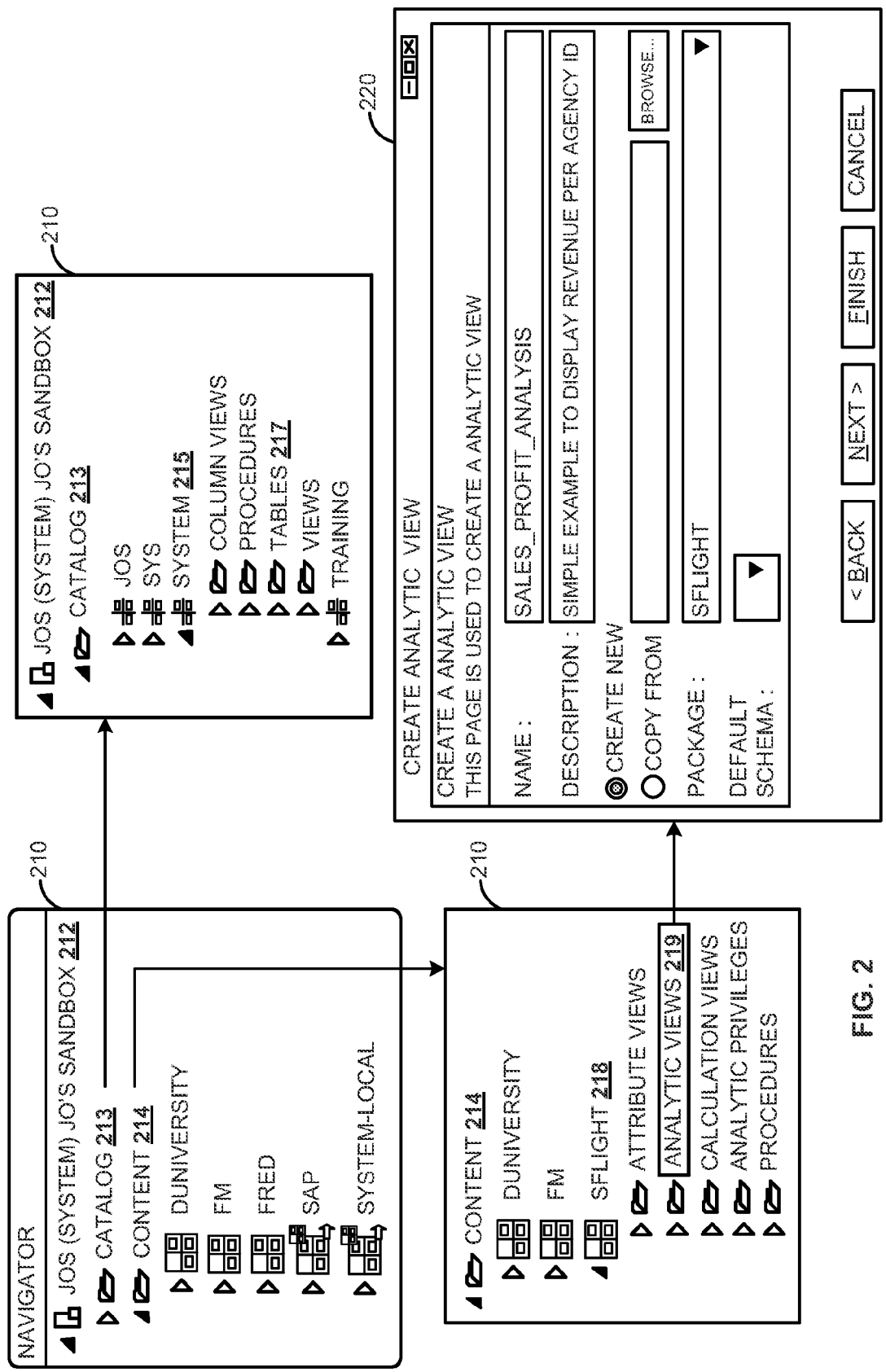
FIG. 2 shows exemplary screenshots depicting the information model generation process in an in-memory modeler tool.

As shown in FIG. 2, a newly added system node 212 "JOS (System)" is added to the Navigator pane 210. The expanded system node 212 shows two sub-nodes Catalog 213 and Content 214 under the Navigator view. The Catalog 213 sub-node represents information modeler tool's data dictionary, i.e., all data structures, tables, and data which can be used. The sub-node Content 214 represents the design-time repository which holds all models crated within the Information Modeler.

Subsequently, table definitions (source system metadata) are imported from a specified source system location. These table definitions are used for creating various content models such as attribute, analytic, and calculation views. Based on the requirement, the table definitions can be imported in mass, i.e., all table definitions are imported from a source system or selectively, i.e., importing only selected table definitions from a source system.

Procedure for Mass Import:
1. In the File menu, choose Import.
2. Expand the information Modeler Tool's Content node.
3. Choose Mass Import of Metadata.
4. Choose Next.
5. Select the target system where you want to import all the metadata.
6. Choose Next.
7. In the Connection Details dialog, enter the OS User and Password of the target system.
8. Select the required source system.

Once the table definitions are imported, the process involves loading data into the table definitions from a source such as a source ERP system according to the following procedure:

1. From the Quick Launch page, choose Data Provisioning.
2. If you are using SLT-based replication, choose Source.
3. Choose Load (for initial load) or Replicate (for data replication) as appropriate.
4. Select the required tables.
5. Choose Add.
6. If you are using the load controller infrastructure, choose Next and enter the operating system user name and password.
7. Choose Finish.

Once the data is loaded into the table definitions, the tables appear in a schema node System 215 of the catalog sub-node 213. All the tables that were imported will be listed under the Tables 217 node. However, it should be noted that the tables appear in the schema even as early as when the table definitions are imported, for further processing.

After loading data into the table definitions, the process involves creating the appropriate informational views that are required to create and deploy the content. In addition to creating the information views, additional objects such as packages (for organizing content), procedures (for SQL routines that need to be called repeatedly), and analytic privileges (for applying restrictions on which data users can see), as appropriate can be created.

In an example, an analytic view is generated to define a multidimensional view (e.g., OLAP cube) based on database tables, attribute views and facts of a specific table. The analytic view is generated according to the following procedure, as shown in FIG. 2:

1. In the Modeler perspective, expand the Content node 214 of the required system.
2. Select the package where you want to save your information object (e.g., sflight 218).
3. From the context menu choose, New>Analytic View (219).
4. Enter a name and description for the view in a dialogue window (220).
5. To create data foundation for the view, perform substeps of the required scenario given in the table below:

TABLE 1

| Scenario | Substeps |
| --- | --- |
| Create a new analytic view. | a. Choose Create New.<br>b. If you want to perform currency conversion for measures, select the required schema from the Schema for Conversion.<br>c. Choose Next.<br>d. Add the required tables and attribute views to the Selected list.<br>e. Choose Finish. |
| Create an analytic view from an existing analytic view. | a. Choose Copy From.<br>b. If you want to perform currency conversion for measures, select the required schema from the Schema for Conversion.<br>c. Select the required analytic view.<br>d. Choose Finish. |

The required table fields of the added tables are then defined as attributes or measures. For example, in order to include a table field in the output structure, from the context menu, the table field is defined as an attribute. On the other hand, a table field is defined as a measure if the data from the corresponding fact table needs to be viewed for analysis. Also, attributes and measures that are not required for client consumption can be hidden.

Figure 3:
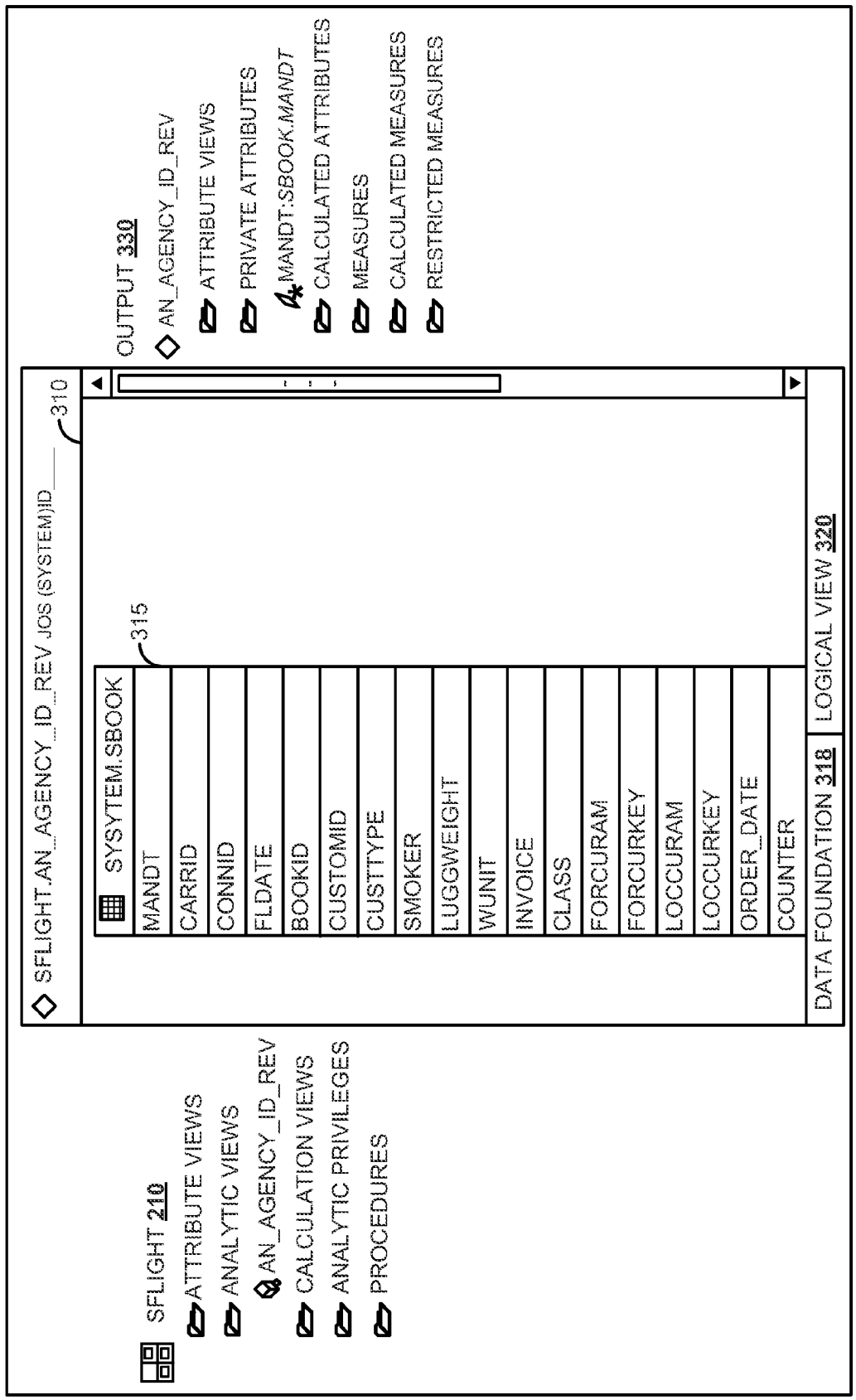
FIG. 3 is an exemplary screenshot depicting an in-memory modeler interface for generating information models.

As shown in FIG. 3, when a new analytic view is set to be created using one of the sub-steps in Table 1, a modeler canvas 310 labeled with the specified name package appears in the main window of the modeler. The canvas is initially empty until the tables to be used in modeling the analytic view are defined. In order to add tables, in the Navigator view, the required table is identified under Catalog/SYSTEM/Tables, and dragged and dropped onto the empty modeler canvas. The modeler canvas then displays a tabular structure 315 having the table's name and all of its attributes and columns in the "data foundation" view 318 of the canvas. The logical view tab 320, at this stage is empty since none of the attributes in the table are defined. The table attributes can be selectively defined in the data foundation view tab as attributes, key attributes, or measures in order to view only those attributes of interest in the generated attribute view.

Once the attributes and measures in the table are defined, the correspondence of attributes and measures appear in the logical view tab 320 on the canvas 310. Also, the attributes and measures defined in the data foundation tab 318 correspondingly create a new node in the output table 330 under the defined type of attributes and measures.

Similarly, an Attribute view is created to model descriptive attribute data (that does not contain measures) using attributes according to the following procedure:
1. In the Modeler perspective, expand the Content node of the required system.
2. Select the package where you want to save your information object.
3. From the context menu, choose New>Attribute View.
4. Enter a name and description for the view.
5. To create data foundation for the view, perform sub-steps of the required scenario given in the Table 2 below:

TABLE 2

| Scenario | Substeps |
| --- | --- |
| Create a view with table attributes | a. Choose Standard.<br>b. Choose Next.<br>c. Add the required tables to the Selected list. |
| Create a view with time characteristics | a. Choose Time.<br>b. In the Calendar Type field, select the required option.<br>If the calendar type is Fiscal, select a variant table, and a fiscal variant.<br>If the calendar type is Gregorian, select the granularity for the data.<br>c. To select a table for defining the view's output structure, perform one of the following substeps:<br>To use the default table, select Auto Create.<br>To specify tables, choose Next and select the required tables. |
| Derive a view from an existing view - in this case, you cannot modify the derived view. | a. Choose Derived.<br>b. Select the required attribute view. |
| Copy a view from an existing view - in this | a. Choose Copy From.<br>b. Select the required attribute view. |

TABLE 2-continued

| Scenario | Substeps |
| --- | --- |
| case, you can modify the copied view. | |

6. Choose Finish.

Once a new attribute view is set to be created using one of the sub-steps in Table 2, in the main view a modeler canvas labeled with the specified name package appears. The canvas is initially empty until the tables to be used in modeling the attribute view are defined. In order to add tables, in the Navigator view, the required table is identified under Catalog/SYSTEM/Tables, and dragged and dropped onto the empty modeler canvas. The modeler canvas then displays a rectangular box having the table's name and all of its attributes and columns under the tab "data foundation." The logical view tab, at this stage is empty since none of the attributes in the table are defined. The table attributes can be selectively defined from the data foundation tab as view attributes, key attributes, or measures in order to view only those attributes of interest in the generated attribute view.

Once the attributes and measures in the table are defined, the correspondence of attributes selected and defined appears in the logical view tab on the canvas. The logical view can be thought of as a black-box view of the model being generated. Also, the attributes and measures defined in the data foundation tab correspondingly create a new node in the output table under the defined type of attributes and measures. The created model (attribute view) is then saved by choosing File>Save from the top pull-down menu or through Ctrl-S command. The new attribute view appears in the Navigator view as a node in the created package. An icon marked with a gray diamond indicates that the model has been saved in the repository but has not been activated yet, i.e. no run-time object in Schema_SYS_BIC has been created. The analytic view can be activated by right-clicking on Navigator node for the created attribute view and selecting an Activate option. The gray diamond will disappear to signal a successful activation.

Similarly, one or more attribute views and analytic views can be generated. The different views can then be joined into a star schema, with the attribute view as one "arm" of the star and the data foundation table used for creating the analytic view as its center. The data preview option can be invoked on the analytic view to see that the attribute view has been linked into the attributes of the data foundation table used for creating the analytic view.

According to an embodiment of the inventive concept, the information model generation process involves importing data foundation from Semantic layer files (e.g., Universe files) into in-memory information modeler tool (e.g., SAP HANA Studio) in order to build information models.

The semantic based information design tool (e.g., SAP Business Objects Information Design Tool) is a metadata design environment that enables a designer to extract, define, and manipulate metadata from relational and OLAP sources to create and deploy semantic layers (e.g., SAP BusinessObjects Universes). A semantic layer is an organized collection of metadata objects that enable business users to analyze and report on corporate data in a non-technical language. These metadata objects include dimensions, measures, hierarchies, attributes, pre-defined calculations, functions, and queries. The metadata object layer, called the business layer, is built on a relational database schema or an OLAP cube, so the objects map directly to the database structures via SQL or MDX expressions. A semantic layer includes connections identifying the data sources so queries can be run on the data.

The role of the semantic layer is to provide the business user with semantically understandable business objects. The user is free to analyze data and create reports using relevant business language regardless of the underlying data sources and structures.

To enable the designer to create semantic layers, the information design tool provides the resources necessary to do the following:

Create connections to data sources.

Extract a complete OLAP cube schema.

Extract tables and joins to build a relational schema called a data foundation.

Create metadata objects from the cube or the data foundation. These objects are contained and organized in a business layer. The SQL and MDX expressions within objects can be validated and queries run against the target databases to test the business layer.

Share resources to allow multiple designers to work on the same resources concurrently.

Publish a semantic layer, which compiles the business layer, the data foundation, and the connections into a single semantic layer file (e.g., .unx file): Publish a semantic layer to a repository to be implemented in deployments of semantic based information design tools' data analysis and reporting applications.

Publish a semantic layer locally, to be implemented by client applications in standalone mode (for example Web Intelligence Rich Client).

Create security profiles to define user access to semantic layer data and metadata.

A data foundation in the semantic layer is a schema that defines the relevant tables and joins from one or more relational database objects. The data foundation can be enhanced by adding derived tables, alias tables, calculated columns, additional joins, contexts, prompts, lists of values, and other SQL definitions. The data foundation becomes the basis of one or more business layers. Data foundations are stored in the local project as .dfx files.

Figure 4A:
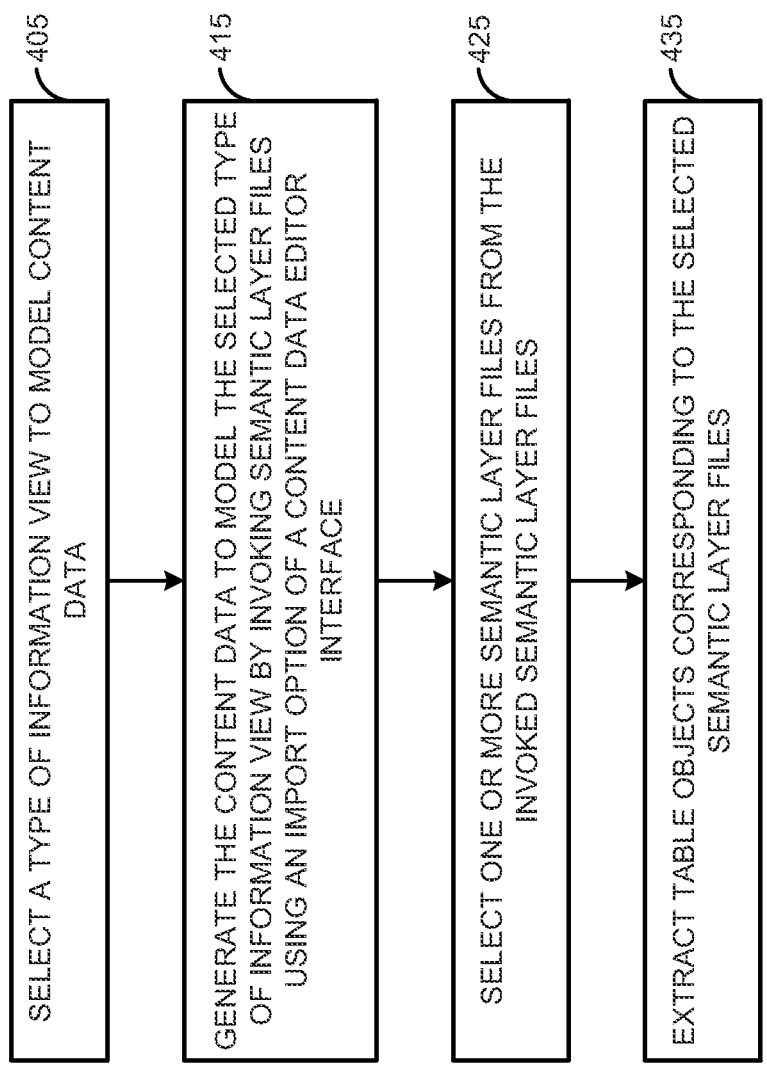
FIG. 4A is a flow diagram of an embodiment of a method of generating information models in an in-memory database system by importing Semantic layer data foundation, according to an embodiment.
Figure 4B:
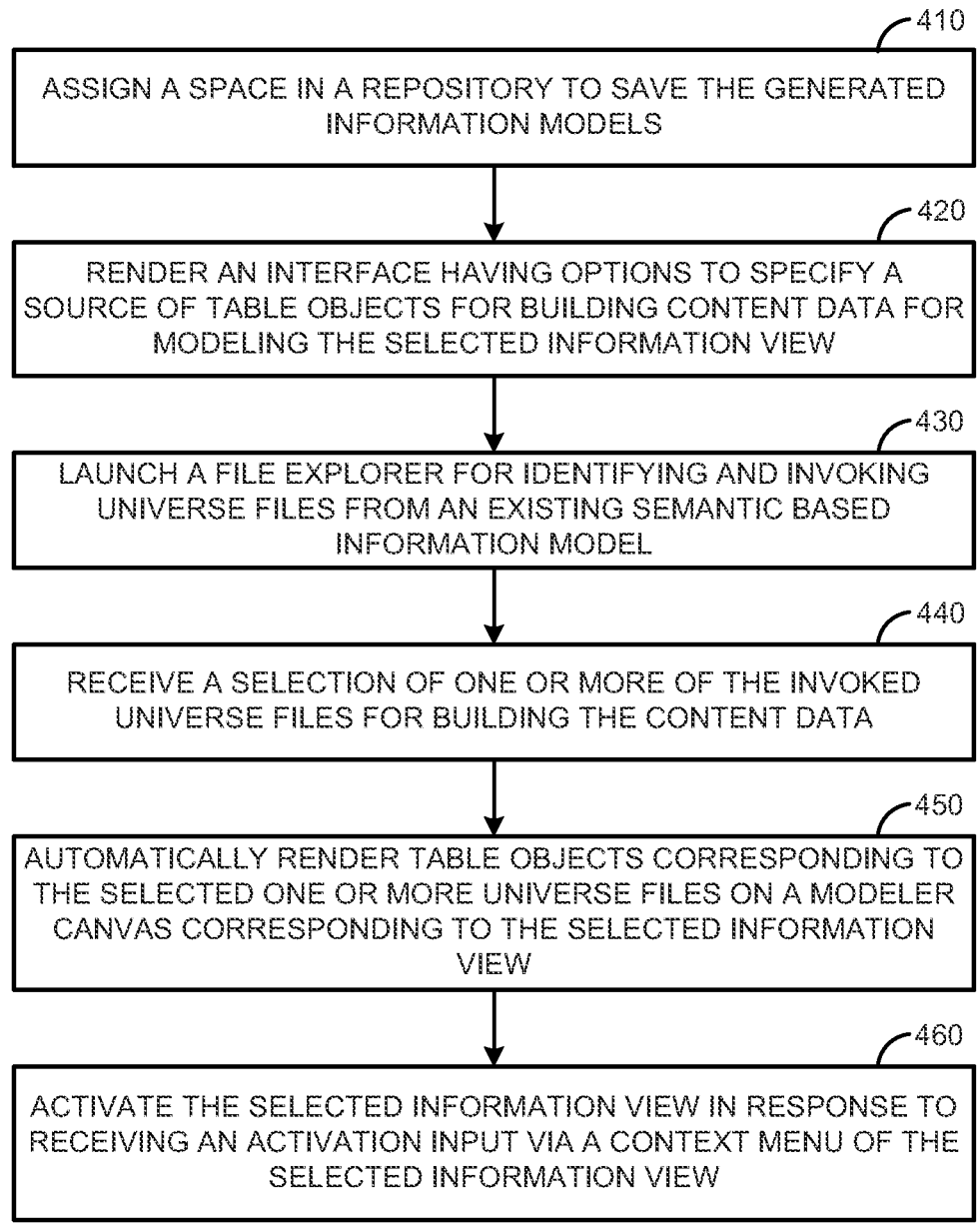
FIG. 4B is a flow diagram of an embodiment of a method of generating information models in an in-memory database system by importing Semantic layer data foundation, according to another embodiment.

The process of importing semantic layer data foundation into in-memory information modeler tool is described with reference to FIGS. 4A and 4B. FIG. 4A shows an exemplary flow of the process of generating information models in an in-memory database system. The method implemented by a computer or any other electronic device having processing capabilities, includes at least the following process illustrated with reference to process blocks 405-435. The model generation process is initiated by switching the perspective to the Information Modeler perspective using options provided in the graphical data modeling tool of the in-memory database system. The Information Modeler perspective offers features to create and edit data models and stored procedures. In the modeler perspective, the process at block 405 involves, selecting a type of information view by which content data is to be modeled. The term "content data" as used herein refers to non-metadata data that is characterized descriptively or quantitatively. At process block 415, the content data for generating the information model according to the selected type of information view is obtained by invoking semantic layer files. In an aspect, the semantic layer files are created in an existing semantic based information model. The semantic layer files are invoked using an import option of a content data editor interface. The content data editor interface is received in response to providing a selection for the type of information view.

At process block 425, the process involves selecting one or more of the invoked semantic layer files that contain content data required to be modeled. At process block 425, the table objects corresponding to the selected one or more semantic layer files are extracted and populated on a modeler canvas of the modeling tool. The extracted table objects also include information relating to the connections and relationships between the tables and the cardinality between the columns of the tables. Further, the one or more columns of the extracted table objects are defined as attributes and measures. In an aspect, only those columns of the table objects which are required to be modeled are defined as attributes or columns. The generated view is then saved and activated. Saving the table objects triggers a validation check.

In more detail, the process of generating information models in an in-memory database system is described with reference to FIG. 4B. The method, implemented by a computer or any other electronic device having processing capabilities, includes at least the following process illustrated with reference to process blocks 410-460. The information model generation process involves defining a space in a repository of the system wherein to store the generated information models. The defined space is created as a node also referred to as a package on the modeler view of the information modeler tool's main window. At process block 420, in response to receiving a selection of a type of information view, a user interface (a dialogue window) is rendered on the modeler main window to receive an input specifying a source of table objects for building content data for modeling the selected information view. At process block 430, upon determining that an "Import" option is selected from the dialogue window, a file explorer is launched for identifying and invoking semantic layer files. In an aspect, the semantic layer files are identified as files having .unv or .unx file extensions.

At process block 440, in response to receiving a selection of one or more of the identified semantic layer files, automatically extracting and rendering table objects corresponding to the selected semantic layer files on the modeler canvas of the modeler main window, at process block 450. The extracted table objects also include relationships and connections between table columns and cardinality between the table columns. Further, at process block 460, the selected information view is activated after receiving an input to activate the selected information view. However, in order to activate an information view by saving the information model in the repository.

The imported semantic layer data foundation can be saved which in turn triggers a validation on the Table existence. At the end of validation, the user may be provided with an option to either accept the creation of missing objects that are part of the data foundation using the information available on the file source and the data foundation metadata or proceed to save the data foundation anyways without creating the missing parts. However, the downside of ignoring the tool's suggestion to create the missing objects during validation is that the information model cannot be activated although the tools allows for the model to be built.

In an aspect, user can build the required information model by either removing unwanted data foundation objects or can keep the data foundation as it is and only define the required columns as attributes and measures to complete the required information model. User will be allowed to reuse the file source for building multiple information models in which user has to follow the above described steps each time.

The information model generation process in the in-memory modeler is described in more detail with reference to FIGS. 5 and 6. In an embodiment, the information view generation process is similar to the process described with reference to FIG. 2 up until the step of initiating the information view creation process. Referring to the example used with reference to FIG. 2, the attribute view is set to be created according to the procedure:
1. In the Modeler perspective, expand the Content node of the required system.
2. Select the package where you want to save your information object.
3. From the context menu, choose New>Attribute View.
4. Enter a name and description for the view.

Figure 5:
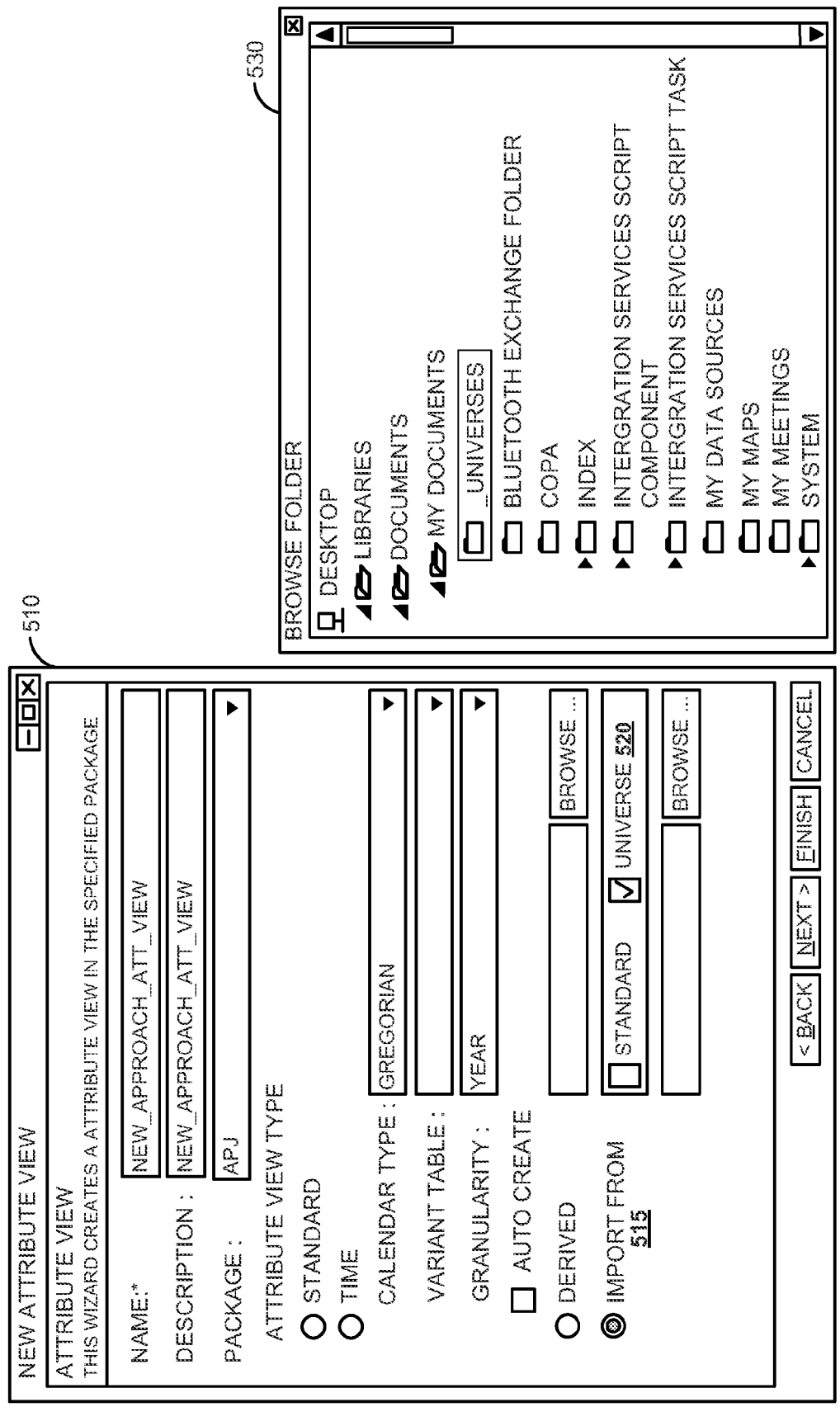
FIG. 5 is an exemplary screenshot depicting an in-memory modeler tool for generating information models, according to an embodiment.
Figure 6:
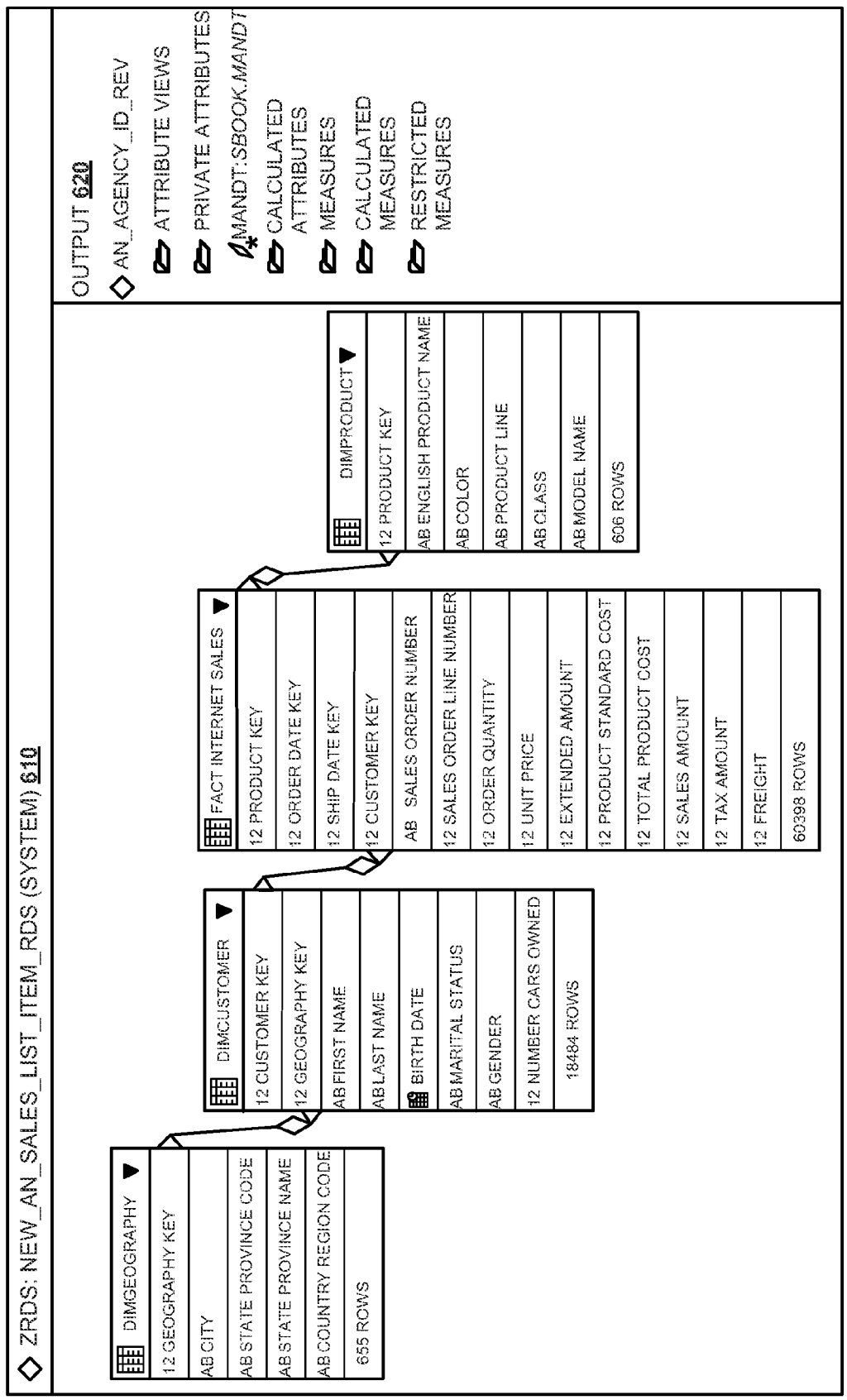
FIG. 6 is an exemplary screenshot depicting an in-memory modeler tool for generating information models, according to an embodiment.

However, the subsequent step of creating data foundation according to one of the scenarios in TABLE 2 is performed differently as shown in FIG. 5. According to an aspect, in response to receiving a selection of a type of view to be generated, the modeler tool renders the dialogue window 510 as shown in FIG. 5. The dialogue window 510 includes options 515 to import semantic layer files that are published to a local file source or a repository. Upon receiving a selection of the radio button 520, the modeler tool launches a file explorer 530 for browsing semantic layer files. The file explorer 530 may automatically search for and identify semantic layer files from the file source. A user may then select some or all of the semantic layer files for importing. Upon receiving a selection of the semantic layer files, the modeler tool automatically, extracts the corresponding table objects (dimensions, measures, hierarchies, attributes, pre-defined calculations, functions, and queries) along with the schema (data foundation) defining the tables and joins. The extracted data foundation is then directly rendered onto the modeler canvas 610 corresponding to the information view being created, as shown in FIG. 6. The semantic layer data foundation is interpreted by the modeler tool and the attributes are rendered on the output window 610 according to the attribute definitions from the Semantic layer files.

Figure 7:
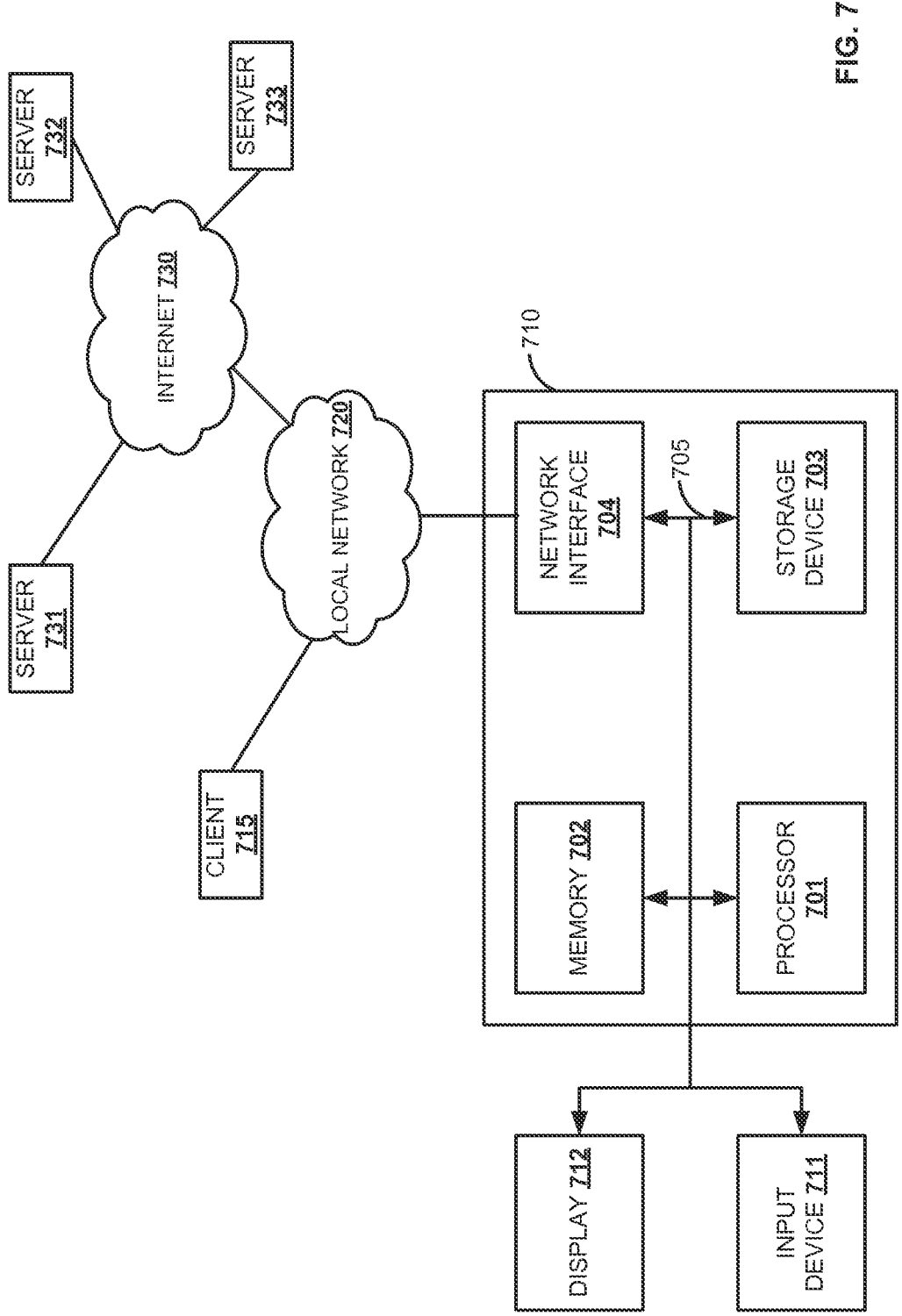
FIG. 7 is a block diagram of a conceptual block-diagram of an in-memory database system, according to an embodiment.

FIG. 7 is a block diagram of an example computer system and network 700 for implementing embodiments of the present disclosure. Computer system 710 includes a bus 705 or other communication mechanism for communicating information, and a processor 701 coupled with bus 705 for processing information. Computer system 710 also includes a memory 702 coupled to bus 705 for storing information and instructions to be executed by processor 701, including information and instructions for performing the techniques described above. This memory 702 may also be used for storing temporary variables or other intermediate information during execution of instructions to be executed by processor 701. Possible implementations of this memory may be, but are not limited to, random access memory (RAM), read only memory (ROM) (when not storing temporary variables or other intermediate information), or both. A storage device 703 is also provided for storing information and instructions. Common forms of storage devices include, for example, a hard drive, a magnetic disk, an optical disk, a CD-ROM, a DVD, a flash memory, a USB memory card, a solid state drive, or any other medium from which a computer can read. Storage device 703 may store source code, binary code, or software files for performing the techniques or embodying the constructs above, for example.

Computer system 710 may be coupled via bus 705 to a display 712, such as a cathode ray tube (CRT) or liquid crystal display (LCD), for displaying information to a computer user. An input device 711 such as a keyboard and/or mouse is coupled to bus 705 for communicating information and command selections from the user to processor 701. The combination of these components allows the user to communicate with the system. In some systems, bus 705 may be divided into multiple specialized buses.

Computer system 710 also includes a network interface 704 coupled with bus 705. Network interface 704 may provide two-way data communication between computer system 710 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 704 sends and receives electrical, electromagnetic, or optical signals that carry digital data streams representing various types of information.

Computer system 710 can send and receive information, including messages or other interface actions, through the network interface 704 to an Intranet or the Internet 730. In the Internet example, software components or services may reside on multiple different computer systems 710 or servers 731, 732, 733, 734 and 735 across the network. A server 731 may transmit actions or messages from one component, through Internet 730, local network 720, and network interface 704 to a component on computer system 710.

The computer system and network 700 may be configured in a client server manner. For example, the computer system 710 may implement a server. The client 715 may include components similar to those of the computer system 710.

More specifically, as described above, the computer system 710 may implement an in-memory database system. The computer system 710 may implement the information model generation process described above. Alternatively, the server 731 may implement the information model generation process and may present the generated information models to the computer system 710, which case the server 731 may be considered a component of the in-memory database system. The server 732 may implement the BW system.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 8:
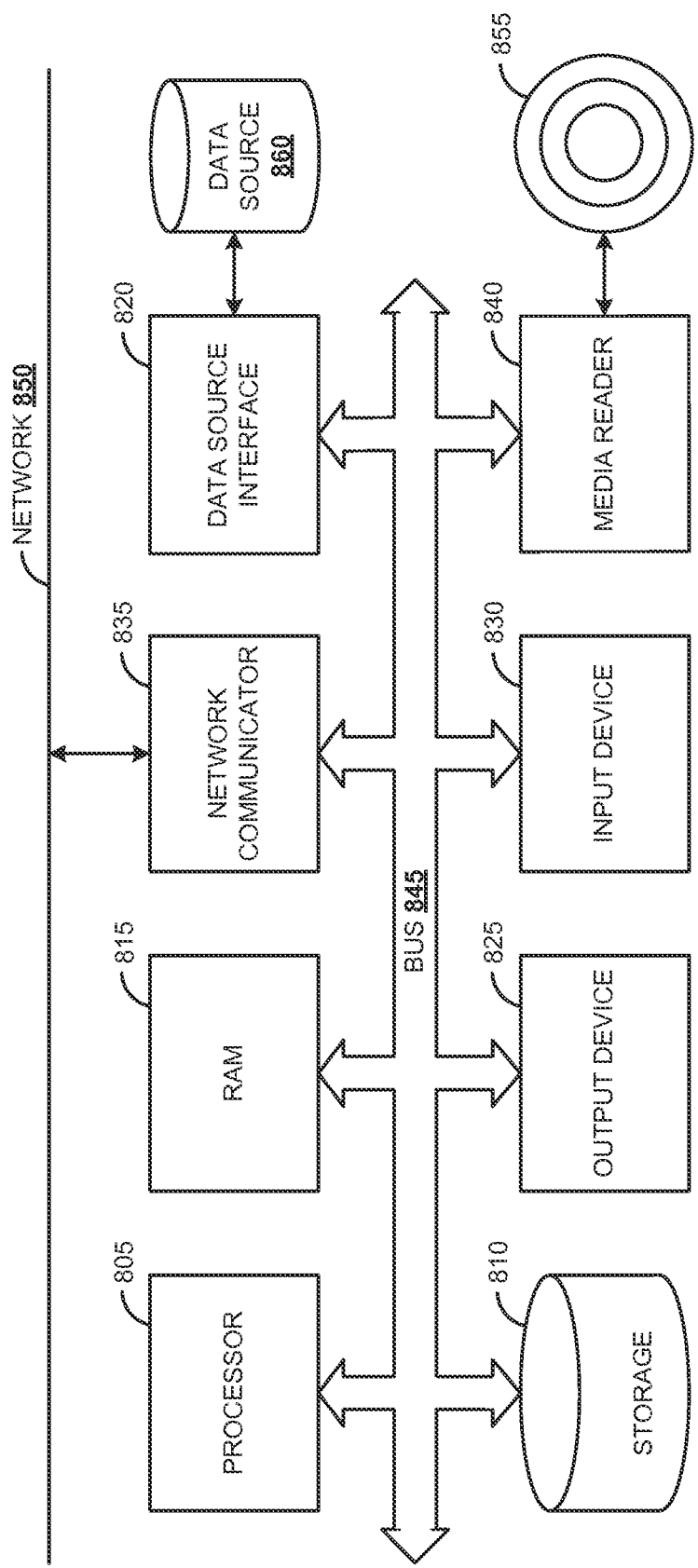
FIG. 8 is a block diagram illustrating a computing environment in which the techniques described for generating information models in an in-memory database system can be implemented, according to an embodiment.

FIG. 8 is a block diagram of an exemplary computer system 800. The computer system 800 includes a processor 805 that executes software instructions or code stored on a computer readable storage medium 855 to perform the above-illustrated methods. The computer system 800 includes a media reader 840 to read the instructions from the computer readable storage medium 855 and store the instructions in storage 810 or in random access memory (RAM) 815. The storage 810 provides a large space for keeping static data where at least some instructions could be stored for later execution. The stored instructions may be further compiled to generate other representations of the instructions and dynamically stored in the RAM 815. The processor 805 reads instructions from the RAM 815 and performs actions as instructed. According to one embodiment, the computer system 800 farther includes an output device 825 (e.g., a display) to provide at least some of the results of the execution as output including, but not limited to, visual information to users and an input device 830 to provide a user or another device with means for entering data and/or otherwise interact with the computer system 800. Each of these output devices 825 and input devices 830 could be joined by one or more additional peripherals to further expand the capabilities of the computer system 800. A network communicator 835 may be provided to connect the computer system 800 to a network 850 and in turn to other devices connected to the network 850 including other clients, servers, data stores, and interfaces, for instance. The modules of the computer system 800 are interconnected via a bus 845. Computer system 800 includes a data source interface 820 to access data source 860. The data source 860 can be accessed via one or more abstraction layers implemented in hardware or software. For example, the data source 860 may be accessed by network 850. In some embodiments the data source 860 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

The invention claimed is:

1. A method of generating information models using a graphical data modeling tool of an in-memory database system, the method comprising:
   at a computer, rendering a user interface of the graphical data modeling tool; and
   in a modeler perspective of the graphical data modeling tool:
      receiving a selection of a type of information view of a plurality of types of information views, to model content data; and
      the computer generating the content data to model an information view of the selected type, the generating comprising:
         assigning a space in a repository to save generated information models, in response to receiving an input to create a new space;
         in response to receiving the selection of the type of information view from the plurality of types of information views, rendering an interface having options to specify a source of table objects for building content data for modeling the information view of the selected type;
         in response to receiving a selection of an import option in the interface, launching a file explorer for identifying and invoking semantic layer files from a file source associated with an existing semantic based information model;

receiving a selection of one or more of the invoked semantic layer files that comprise the content data to be modeled;

automatically rendering table objects corresponding to the selected one or more semantic layer files on a corresponding modeler canvas to model the information view of the selected type, wherein relationships and connections between table columns are automatically identified from the semantic layer files and populated in the modeler canvas, and further wherein cardinality between the table columns are automatically read from the semantic layer files and populated in the modeler canvas; and activating the information view of the selected type in response to receiving an activation input.

2. The method of claim 1, wherein selecting the type of information view to model content data invokes a content data editor with the import option to import semantic layer files.

3. The method of claim 2, wherein receiving the selection of the import option launches the file explorer to identify files having .unx and .unv file extensions.

4. The method of claim 1, further comprising generating an information model by defining, based on a selection, one or more columns of the table objects as attributes and measures.

5. The method of claim 4 further comprising, activating the generated information model in response to receiving a selection of a corresponding item of a context menu of the assigned space in the repository.

6. The method of claim 5, wherein activating the generated information model comprises saving the table objects corresponding to imported semantic layer files.

7. The method of claim 6, wherein saving the table objects in-turn triggers a validation check on the table objects.

8. The method of claim 1, wherein extracting the table objects further comprises annotating the table objects with the identified relationships and connections.

9. The method of claim 1, further comprising generating multiple information models by reusing the semantic layer files from the file source.

10. The method of claim 1, wherein the semantic layer files are created using a non-database system.

11. A non-transitory computer readable storage medium storing instructions which when executed by a computer cause the computer to perform operations to generating information models, the operations comprising:

generate an in-memory database system component configured to control the computer to:

assign a space in a repository to save generated information models, in response to receiving an input to create a new space;

in response to receiving a selection of a type of information view from a plurality of types of information views, render an interface having options to specify a source of table objects for building content data for modeling an information view of the selected type;

in response to receiving a selection of an import option in the interface, launch a file explorer for identifying and invoking semantic layer files from a file source associated with an existing semantic based information model;

receive a selection of one or more of the invoked semantic layer files that comprise the content data to be modeled;

automatically render table objects corresponding to the selected one or more semantic layer files on a corresponding modeler canvas to model the information view of the selected type, wherein relationships and connections between table columns are automatically identified from the semantic layer files and populated in the modeler canvas, and further wherein cardinality between the table columns are automatically read from the semantic layer files and populated in the modeler canvas; and activate the information view of the selected type in response to receiving an activation input.

12. The computer readable storage medium of claim 11, wherein the semantic layer files are created using a database system built from data stored in an external storage space of the computer.

13. An in-memory database system comprising:

a data source system; and a computer comprising a memory to store a program code, and a processor to execute the program code to:

assign a space in a repository to save generated information views;

receive a selection of a type of information view from a plurality of types of information views, and in response, render a user interface having options to specify a source of table objects for building content data for modeling an information view of the selected type;

receive a selection of an import option in the user interface, and in response, launch a semantic layer extractor for identifying and invoking semantic layer files from a file source associated with an existing semantic based information model;

receive a selection of one or more of the invoked semantic layer files that comprise the content data to be modeled;

automatically render table objects corresponding to the selected one or more semantic layer files on an initially empty modeler canvas to model the information view, wherein relationships and connections between table columns are automatically identified from the file source and populated in the modeler canvas, and further wherein cardinality between the table columns are automatically read from the file source and populated in the modeler canvas; and activate the information view in response to receiving an activation input via a context menu of the user interface.

14. The system of claim 13, wherein the table objects comprise content data including attributes and measures.

15. The system of claim 13, wherein the type of information view includes an attribute view, analytic view, and calculation view.

16. The system of claim 13, wherein the content data is a schema that defines relevant tables and connection between columns of the relevant tables.

17. The system of claim 13, wherein the assigned space is in the repository of the in-memory database system for saving the generated information views.

18. The system of claim 13, wherein the semantic layer files include third-party content data including common warehouse meta-model (CWM) and standard compliant Entity-relationship (ER) Models.

19. The system of claim 13, wherein the semantic layer files are created using a disk storage based database system.

* * * * *